(12) United States Patent
Gerstl et al.

(10) Patent No.: US 9,607,021 B2
(45) Date of Patent: Mar. 28, 2017

(54) LOADING DATA WITH COMPLEX RELATIONSHIPS

(71) Applicant: International Business Machines Corporation, Armonk, NY (US)

(72) Inventors: Peter Gerstl, Holzgerlingen (DE); Mike Grasselt, Leinfelden-Echterdingen (DE); Albert Maier, Tuebingen (DE); Thomas Schwarz, Stuttgart (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/511,164

(22) Filed: Oct. 9, 2014

(65) Prior Publication Data
US 2015/0106381 A1 Apr. 16, 2015

(30) Foreign Application Priority Data
Oct. 10, 2013 (GB) .................................. 1317899.1

(51) Int. Cl.
*G06F 17/30* (2006.01)

(52) U.S. Cl.
CPC .................................. *G06F 17/303* (2013.01)

(58) Field of Classification Search
None
See application file for complete search history.

(56) References Cited

U.S. PATENT DOCUMENTS

| 6,456,995 | B1 | 9/2002 | Salo et al. |
| 6,542,883 | B1 | 4/2003 | Salo |
| 7,536,401 | B2 | 5/2009 | Bitonti et al. |
| 8,010,521 | B2 | 8/2011 | Fischbach |
| 8,150,811 | B1 | 4/2012 | Tarenskeen et al. |
| 2002/0095421 | A1* | 7/2002 | Koskas ............ G06F 17/30595 |
| 2002/0099688 | A1 | 7/2002 | Attaluri et al. |
| 2005/0165866 | A1* | 7/2005 | Bohannon ......... G06F 17/30483 |

(Continued)

OTHER PUBLICATIONS

Cormen, Thomas H. et al.; "Introduction to Algorithms"; The MIT Press; 1990; pp. 469-475.

(Continued)

*Primary Examiner* — Wilson Lee
(74) *Attorney, Agent, or Firm* — North Shore Patents, P.C.; Michele Liu Baillie

(57) ABSTRACT

Data to be loaded into a target system includes entities having corresponding unique primary data value and secondary data values. The secondary data values have associated foreign key relationships, which links the secondary data value to the primary data value of another entity. In loading the data, the entities are split into insertion leaf groups by execution of an iteration process, each iteration involving generation of a respective set of insertion leaf groups containing entities whose secondary data values have no foreign key relationships or only foreign key relationships with the primary data values of entities of the insertion leaf groups generated during any prior iteration. The iteration process is executed until there are no such entities are left. A sequence of generation of the sets of insertion leaf groups is recorded, and the sets of insertion leaf groups are consecutively loaded into the target system according to the sequence.

15 Claims, 17 Drawing Sheets

(56) References Cited

U.S. PATENT DOCUMENTS

| | | | |
|---|---|---|---|
| 2008/0133493 A1 | 6/2008 | Bender | |
| 2011/0060719 A1 | 3/2011 | Kapoor | |
| 2012/0233217 A1 | 9/2012 | Purpus et al. | |
| 2012/0265734 A1* | 10/2012 | Perez | G06F 17/30292 707/687 |
| 2013/0117429 A1* | 5/2013 | Koponen | H04L 41/00 709/223 |
| 2013/0318066 A1* | 11/2013 | Atherton | G06F 17/30864 707/709 |

OTHER PUBLICATIONS

Festa, Paola et al; "Feedback Set Problems"; AT&T Labs Research Technical Report; Feb. 18, 1999.
Fujimoto, K. et al; "A Mapping Scheme of XML Documents into Relational Databases Using Schema-Based Path Identifiers"; International Workshop on Challenges in Web Information Retrieval and Integration; 2005.
Missaoui, R. et al; "Migrating to an Object-Oriented Database Using Semantic Clustering and Transformation Rules"; Data & Knowledge Enginnering vol. 27, Issue 1; Aug. 1998; pp. 97-113.
Festa, P., et. al.; "Feedback set problems"' Handbook of Combinatorial Optimization, Supplement vol. A, Kluwer Academic Publishers, pp. 209-259; May 1999.

* cited by examiner

| | | |
|---|---|---|
| Iteration i:=1 | I_1 nodes (Fig. 11) | 320, 321, 322 |
| | Sequence of executed process blocks (Fig. 12) | 500, 501, 502, 503, 504, 508, 509, 510, 511, 512 |
| | C nodes (Fig. 11) | 300, 301, 302 |
| Iteration i:=2 | Sequence of executed process blocks (Fig. 12) | 503, 504, 505, 506, 507 |
| | I_2 nodes (Fig. 11) | 330, 331, 332, 333 |
| | Sequence of executed process blocks (Fig. 12) | 503, 504, 508, 509, 510, 511, 512 |
| Iteration i:=3 | I_3 nodes (Fig. 11) | 310, 311 |
| | Sequence of executed process blocks (Fig. 12) | 503, 504, 508, 509, 510, 511, 512 |
| Iteration i:=4 | I_4 nodes (Fig. 11) | 312 |
| | Sequence of executed process blocks (Fig. 12) | 503, 504, 508, 509, 510 |

Fig. 13

```
1   Input: A set T of tuples for a given table schema S.
2
3   Output: A directed graph G=(N, E)
4   (*** N is a set of nodes, E is a set of edges, M maps tuples to nodes ***)
5   N := empty set;
6   E := empty set;
7   M := empty map from T to N;
8   (* Create all nodes *)
9   for each t in T do
10      Create new node n;
11      Add n to N;
12      M[t] := n;
13  endfor
14
15  (* create all edges *)
16  for each t in T do
17      for each outgoing relationship that points to tuple t' do
18          Add (M[t], M[t']) to E;
19      endfor
20  endfor
21
22  return (N, E);
```

Fig. 15

```
 1  Input: A directed graph G=(N, E)
 2
 3  Output: Insertion groups I_1, ..., I_n and a cycle insertion group C
 4
 5  (*** Initialization ***)
 6  C := empty set;
 7
 8  START: (* label *)
 9  Q := empty queue;
10  V := empty map from nodes to integers;
11  m := |N|;
12  i := 1;
13  stopProcessing := false;
14
15  (* Store the number of outgoing edges for each node *)
16  for each n in N do
17      V[n] := outdegree(n);
18      (* Enqueue all end nodes *)
19      if V[n] = 0 do
20          enqueue(Q, n);
21      endif
22  endfor
23  (* Color all edges black *)
24  for each e in E do
25      c[e] := black;
26  endfor
27  (* add marker to queue *)
28  enqueue(Q, MARKER);
29  (*** Actual processing ***)
30  while (Q is not empty and stopProcessing = false) do
31      x := dequeue(Q);
32      if (x is MARKER) do
33          if (I_i is empty) do
34              (* previous insertion class is empty *)
35              stopProcessing := true;
36          else
37              enqueue(Q, MARKER);
38              i := i + 1;
39          endif
40      else
41          Add x to I_i; (* Add node to current insertion group *)
42          m := m − 1; (* decrement number of nodes added to any
43                        insertion class *)
44          (* for each unvisited incoming edge *)
45          for each incoming edge e of x where c[e] = black do
46              c[e] := white; (* mark the edge as visited *)
47              s := source(e);
48              V[s] := V[s] − 1; (* decrement number of
49                                  outgoing visited nodes of s *)
50              (* If all outgoing edges of s have already been visited
51                 put the node into the queue *)
52              if V[s] = 0 do
53                  enqueue(Q, s);
54              endif
55          endfor
56      endif
57  endwhile
58
59  (*** if not all nodes were added to an insertion group ***)
60  if (m > 0) do
61      Find feedback node set F of G;
62      C := F;
63      Remove F and all adjacent edges from G;
64      goto START;
65  else
66      return (I_1, ..., I_i, C);
67  endif
```

Fig. 16

```
1   (* Insert all records in the cycle class without foreign key
2       relationships *)
3   for all t in C pardo
4       Insert t into the target database where all foreign keys are
5       set to NULL;
6   endfor
7
8   (* For each insertion class in order *)
9   for j=1 to n do
10      (* Insert all tuples of the current insertion group in parallel *)
11      for all t in I_j pardo
12          Insert t into the target database;
13      endfor
14  endfor
15
16  (* Update the foreign key fields of all tuples in the cycle class
17  *)
18  for all t in C pardo
19      Update t in the target database such that all foreign key
20      fields are set to the original references;
    endfor
```

Fig. 17

LOADING DATA WITH COMPLEX RELATIONSHIPS

BACKGROUND

Effective processing of data having complex relationships is an everlasting task of the computer science. For instance, one of typical tasks in this field is migrating objects from one or more computer applications or databases to a single target computer application or database, e.g. in the context of a consolidation or harmonization project, wherein a number of existing systems are replaced by a new system. This also includes incorporating additional source systems comprising the objects into an already existing target. This problem gets further complicated, when the objects comprise instances linked by relationships. Thus migrating of the objects from one computer application to another requires not only transfer of the instances but transfer and update of their relationships.

SUMMARY

The present invention relates to a computer system for loading of data or objects with complex relationships into a target system, a method for migration of data or objects with complex relationships to a target system, a computer program product, and a computer system for loading of data or objects with complex relationships into a target system, wherein data entities or objects are converted into a directional graph.

The present invention provides for embodiments that provide for an improved/effective migration of data or objects to a target computer application or a target system. The data or objects comprise instances linked by foreign key relationships. It should be appreciated that the present invention can be implemented in numerous ways, including as a method for loading data into a target system, a computer system for loading of data into a target system, or a computer program product carrying computer executable code for execution by a processor controlling an apparatus. Several inventive embodiments are described below.

One embodiment provides a computer implemented method for loading data into a target system. The data comprises entities. Each entity has a corresponding unique primary data value and one or more corresponding secondary data values. At least a portion of the secondary data values has associated foreign key relationships. Each foreign key relationship links the corresponding secondary data value to the corresponding primary data value of another entity. The method comprises the following steps.

The entities are split into insertion leaf groups by execution of an iteration process comprising execution of consecutive iterations. Execution of each iteration involves generation of a respective set of the insertion leaf groups. The respective set of the insertion leaf groups comprises all entities whose secondary data values have either no foreign key relationships or only one or more foreign key relationships with the primary data values of the entities of the insertion leaf groups generated during execution of any prior iteration. The iteration process is executed until there are no entities left whose secondary data values have either no foreign key relationships or only one or more foreign key relationships with the primary data values of the one or more entities of the insertion leaf groups generated during execution of any previous iteration. A sequence of generation of the sets of the insertion leaf groups is recorded.

The sets of the insertion leaf groups of the entities and the foreign key relationships linking their secondary data values with the corresponding primary data values are consecutively uploaded into the target system according to the sequence.

This method may have an advantage, that each insertion leaf group and the foreign key relationships linking its secondary data values with the corresponding primary data values is loaded into the target system in a single step. No additional steps are needed for updating foreign key relationships after upload of all insertion leaf groups.

In accordance with another embodiment of the present invention, at least a portion of the foreign key relationships may be cyclic foreign key relationships. The cyclic foreign key relationships link entities comprising the corresponding primary and secondary data values linked by the cyclic foreign key relationships into one or more loops. The entities linked into the one or more loops comprise one or more cycle entities. When all cycle entities and the foreign key relationships linking the primary data values of all cycle entities with the corresponding secondary data values are considered being deleted from the data, the data comprises no loops of the entities any more. Further information regarding description and identification of the cyclic foreign key relationships is published in a book "Handbook of combinatorial optimization", Supplement vol. A, Kluwer Academic Publishers, pp. 209-259.

The aforementioned method comprises additional steps.

A set of the insertion cycle groups is generated. The set of the insertion cycle groups comprises all cycle entities. All cycle entities and the foreign key relationships linking primary data values of the all cycle entities with the corresponding secondary data values are considered being deleted from the data during a splitting of the entities into insertion leaf groups.

Before the consecutive insertion of the insertion of the sets of the leaf groups of the entities and the foreign key relationships linking their secondary data values with the corresponding primary data values into the target system, the entities of the set of the insertion cycle groups are inserted into the target system.

After the consecutive insertion of the sets of the insertion leaf groups of the entities and the foreign key relationships linking their secondary data values with the corresponding primary data values into the target system, the foreign key relationships linking the secondary data values of the entities of the set of the insertion cycle groups with the corresponding primary data values are inserted into the target system.

The method of this embodiment may have an advantage of automated and straightforward processing of the insertion cycle group. This way of data processing does not require any case sensitive tuning and/or optimization.

In accordance with yet another embodiment of the present invention the generating of the set of the insertion cycle leaf groups is performed before the splitting of the entities into the insertion leaf groups.

This way of data processing may enable a reduction in a number of the insertion leaf groups in comparison with the previous embodiment, where the splitting of the entities into the insertion leaf groups is started first.

In accordance with yet another embodiment, after the splitting of the entities into the insertion leaf groups and before the loading of the entities of the set of the insertion cycle groups into the target system, the generating of the set of the insertion cycle groups using the entities not yet split into the insertion leaf groups is performed, wherein after the generating of the set of the insertion cycle groups and before the consecutively loading of the sets of the insertion leaf groups of the entities and the foreign key relationships linking their secondary data values with the corresponding primary data values into the target system, the splitting of the entities into the insertion leaf groups and the recoding of the sequence of generation of the sets of the insertion leaf groups are further performed.

This way of data processing may have an advantage, when there is no prior knowledge regarding presence or absence of the cycle entities in the data available. In a case when there are no cycle entities in the data, the entities are split in the insertion leaf groups in a single non-interrupted iteration process.

In accordance with yet another embodiment of the present invention, after the splitting of the entities into the insertion leaf groups and before the loading of the entities of the set of the insertion cycle groups into the target system, the generating of the set of the insertion cycle groups using the entities not yet split into the insertion leaf groups is performed, wherein after the generating of the set of the insertion cycle groups and before the consecutively loading of the sets of the insertion leaf groups of the entities and the foreign key relationships linking their secondary data values with the corresponding primary data values into the target system the following is performed: deleting the sequence, after the deleting of the sequence restarting of the splitting of the entities into the insertion leaf groups by execution of the iteration process comprising execution of the consecutive iterations.

This way of data processing may have an advantage of reduction in the number of the insertion leaf groups in comparison with the process, when a portion of the entities is split into one or more insertion leaf groups before the insertion cycle group is generated.

In accordance with yet another embodiment of the present invention, the consecutively loading of the sets of the entities of the insertion leaf groups into the target system comprises: splitting the entities of the set of the insertion leaf groups into at least two leaf group portions; and loading each of the at least two leaf group portions into the target database by concurrent execution of loading of entities of the each of the at least two leaf group portions and the foreign key relationships linking their secondary data values with the corresponding primary data values into the target system.

This way of data processing may enable acceleration of data upload in a case when parallel data processing is enabled.

In accordance with yet another embodiment of the present invention, the loading of the entities of the set of the insertion cycle groups into the target system comprises: splitting the entities of the set of the insertion cycle groups in at least two cycle group portions; and loading each of the at least two cycle group portions into the target data base by concurrent execution of loading of entities of the each of the at least two cycle group portions into the target system.

This way of data processing may enable acceleration of data upload in a case when parallel data processing is enabled.

In accordance with yet another embodiment of the present invention, the loading of the foreign key relationships linking the secondary data values of the entities of the set of the insertion cycle groups with the corresponding primary data values into the target system comprises: splitting the foreign key relationships linking the secondary data values of the entities of the set of the insertion cycle groups with the corresponding primary data values into at least two relationship group portions; and loading each of the at least two relationship group portions into the target system by concurrent execution of loading of the foreign key relationships of the each of the at least two relationship group portions into the target system.

This way of data processing may enable acceleration of data upload in a case when parallel data processing is enabled.

In accordance with yet another embodiment of the present invention, the computer implemented method comprises the following.

A directional graph is generated. Each entity corresponds to a unique node of the graph. Each foreign key relationship corresponds to a unique edge of the graph. For a given foreign key relationship linking the respective secondary data value with the respective primary data value, the graph edge begins at the node corresponding to the entity comprising the respective secondary data value and ends at the node corresponding to the entity comprising the respective primary data value.

Utilization of the directional graphs may enable usage of various previously developed software libraries for graph processing. Moreover it provides for a better demonstrativeness, understanding, and applicability of the computer implemented method.

Another embodiment provides a computer program product, in particular a computer readable medium. The computer program product carries computer executable code for execution by a processor controlling an apparatus. Execution of the instructions cause the processor to perform a portion or all steps of the aforementioned computer implemented method for loading the data into the target system.

Yet another embodiment provides a computer system for loading data into the target system. The computer system is operable for performing a portion or all steps of the aforementioned computer implemented method for loading the data into the target system.

BRIEF DESCRIPTION OF THE SEVERAL VIEWS OF THE DRAWINGS

The present invention will be readily understood by the following detailed description in conjunction with the accompanying drawings.

FIG. 13 is a table illustrating splitting of nodes of a directional graph into insertion groups and a corresponding sequence of execution of the process blocks of the flowchart for the generating of the insertion groups.

FIG. 15 is a pseudo code program for generating of a directional graph using data to be loaded into a target system.

FIG. 16 is a pseudo code program for generating of insertion groups using the directional graph.

FIG. 17 is a pseudo code program for loading of the entities corresponding to the nodes of the insertion groups into a target system.

DETAILED DESCRIPTION

Figure 1:
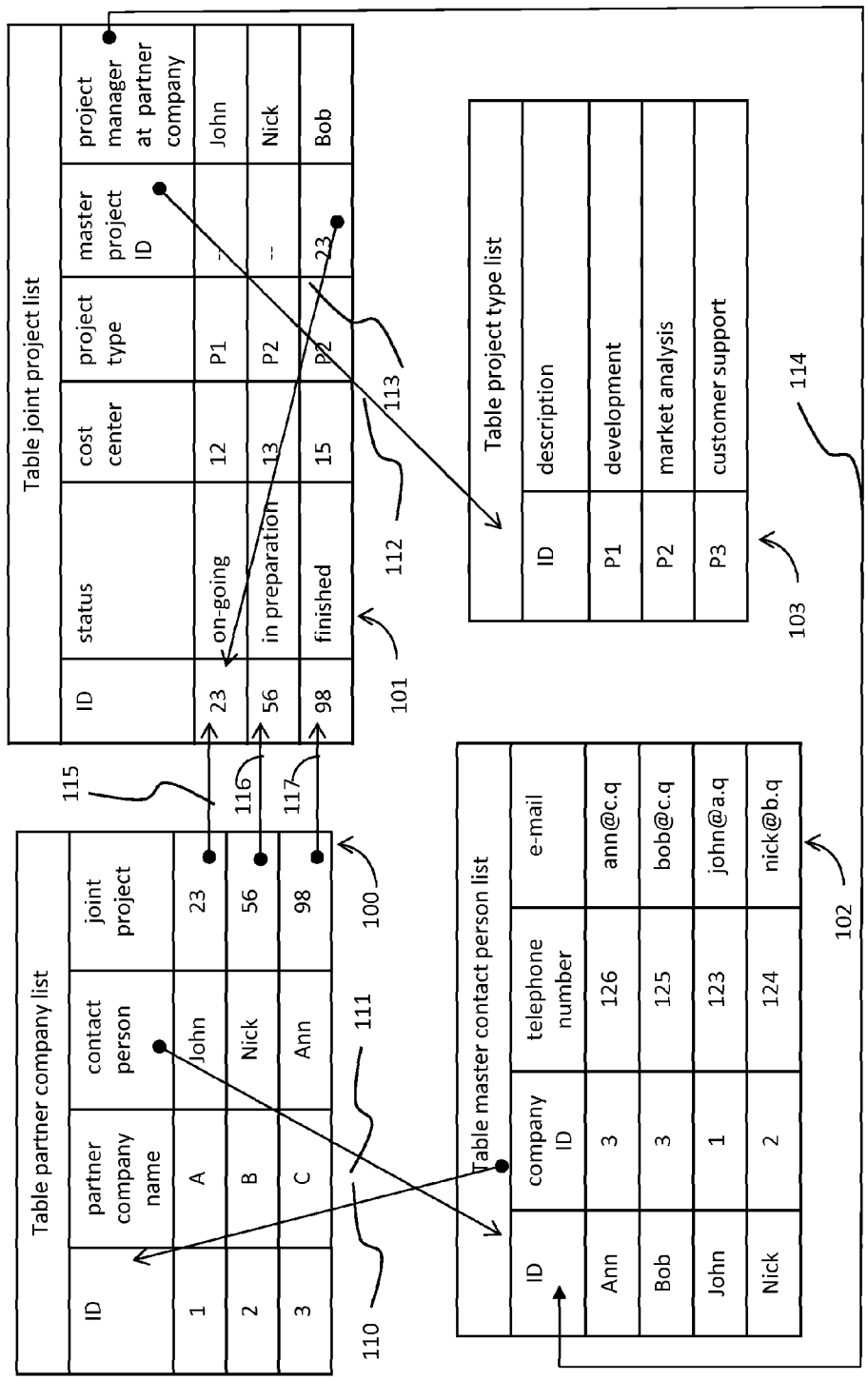
FIG. 1 is an example data used for loading into a target system.

As usual, object instances comprise data being stored in one or multiple tables. The tables and the object instances can be linked by relationships. Relationships between the data of the same object instance being stored in multiple tables are simple to deal with, when they have to be loaded into a target system. Target systems offer, as usual, a capability to upload the contents of all related data of the object instances in a single step, and the target system automatically establishes all relationships between the data of the same object instance stored in multiple tables. An example for such an interface is an intermediate document (IDoc) interface of a Systems Applications and Products in Data Processing (SAP) application system.

Uploading of the object instances is more complicated, when their tables comprise entities (or records) belonging to different object instances that are linked by foreign key relationships. The foreign key relationships may link entities within one table and/or entities within different tables. An application system like a SAP enterprise resource planning (ERP) can process such cases. This application system performs the upload in several steps. First all instances are uploaded with empty foreign key relationships. Afterwards all newly assigned identifiers (or primary keys, or primary values) are extracted from the target system. The extracted identifiers are updated in the target system in accordance with the original foreign key relationships between the entities.

This approach has the following drawbacks. Each instance has to be processed twice causing a longer elapsed time of the upload. Depending on a project type this might not only lead to latency issues, but for example also to longer business blackout periods. Further two different interfaces have to be implemented, i.e. a first interface for data upload and a second interface for foreign key relationship update. In SAP the IDOC interface is used as the first interface and a business application programming interface (BAPI) is used as the second interface. This requires a lot of effort in terms of man-hours in order to implement and to test a logic feeding of the two different interfaces. Moreover special optimization of the second interface is required, when the object instances have the foreign key relationships linking them in one or more loops. The uploaded instances cannot be used before their foreign key relationships are not yet updated. As a result the target system has to be blocked in order to avoid inconsistencies and improper usage.

As it will be clearly seen from the following description the present invention does not have the aforementioned drawbacks and have the following advantages. The upload can be performed in a sequence of steps, which do not require update of the foreign key relationships after loading of data into a target system. The foreign key relationships linking the entities in one or more loops can be processed in a straightforward automated way. Each entity is processed just once during the upload. The upload can be executed using parallel processing and/or portions of the entities can be concurrently uploaded.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing: In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will also be noted that each process block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an example data to be uploaded into a target system. The data is presented in four tables summarizing business relationships and joint projects of a company. The table 100 represents a partner company list. The table 101 represents a joint project list. The table 102 represents a master contact person list. The table 103 represents a project type list. Each first table column represents primary keys (aka identification numbers (ID), the primary data values, or identifiers) of records (aka rows in tables, tuples, or entities) comprising secondary data values. For instance the first record in the table partner company list comprises "1" being the primary data value and "A," "John," "23" being the secondary data values. All foreign key relationships (110, 111, 112, 113, 115, 116, 117) except foreign key relationships (113, 115, 116, 117) of project IDs are depicted at a table level for the sake of demonstrativeness. The foreign key relationships of the project IDs (113, 115, 116, 117) are depicted at an entity level.

Figure 2:
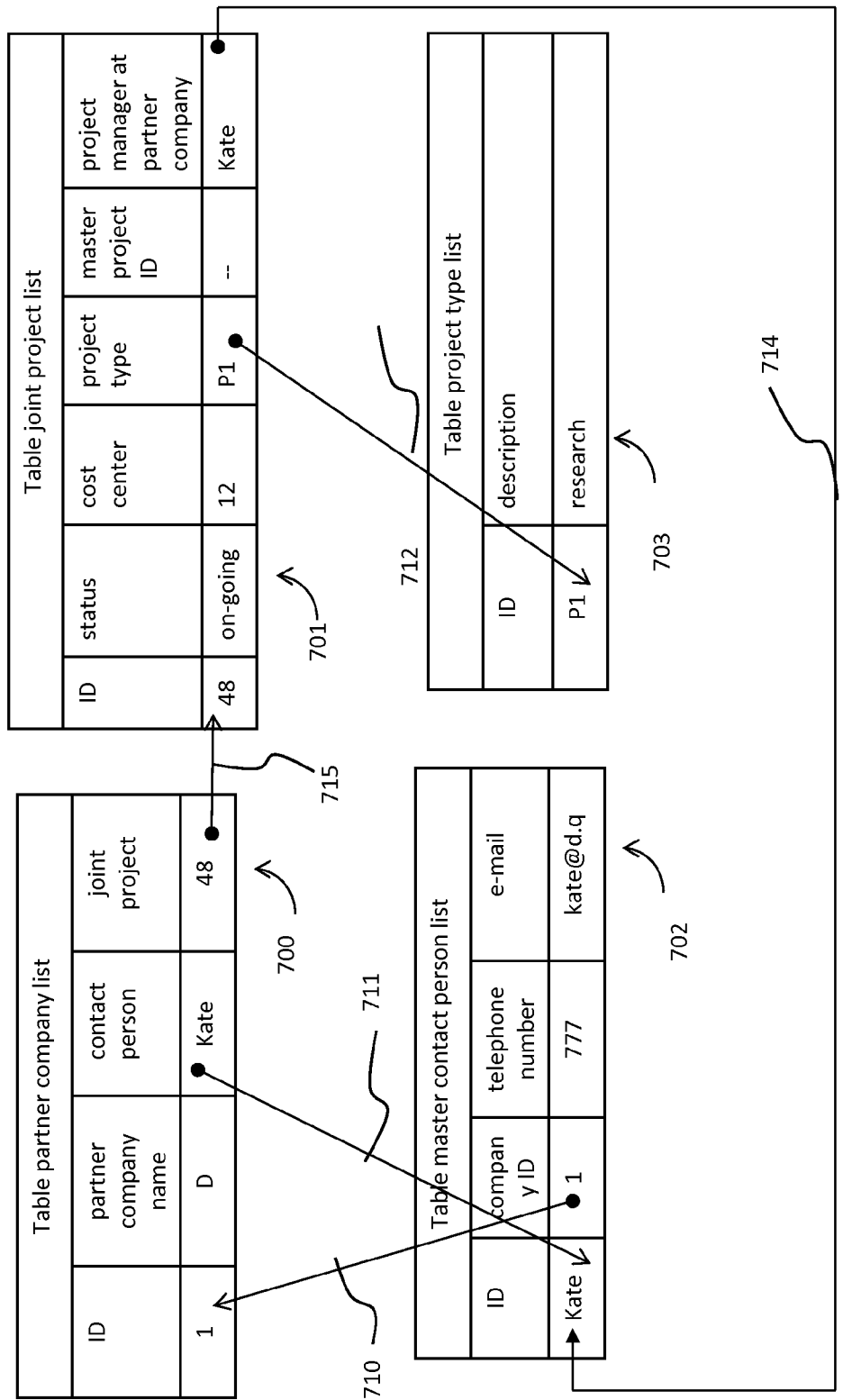
FIG. 2 is an example target database.

FIG. 2 illustrates an example target database. The target database is used for loading the data illustrated on the FIG. 1. The target database comprises four tables summarizing business relationships and joint projects of another company. A table 700 represents a partner company list. A table 701 represents a joint project list. A table 702 represents a master contact person list. A table 703 represents a project type list. Each first table column represents primary keys of records comprising secondary data values. For instance the first record in the table partner company list comprises "1" being the primary data value and "D," "Kate," "48" being the secondary data values. All foreign key relationships (710, 711, 712, 713, and 714) are depicted at the entity level.

Figure 3:
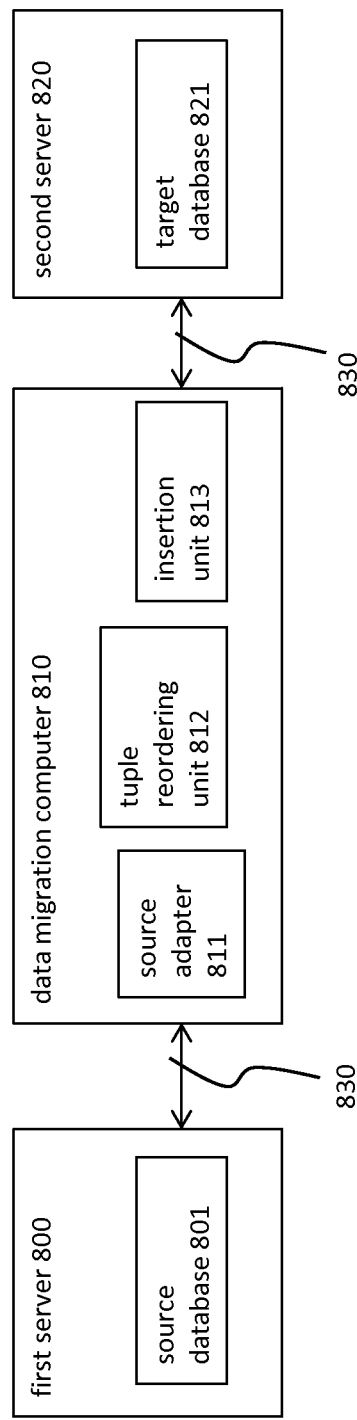
FIG. 3 is a system operable for loading of data of a source database into a target database.

FIG. 3 illustrates a system 810 operable for loading of data of a source database 801 to a target database 821. A first server 800 comprising the source database is connected via a computer network 830 to the system 810. A second server 820 comprising the target data base is connected via the computer network 830 to the system 810. The system comprises a source adapter 811, a tuple reordering unit 812, and an insertion unit 813. Although the system is depicted as a standalone unit, it may be integrated in one of the servers 800 and 820. Alternatively various components of the system 810 can be integrated in both servers 800 and 820. The source database 801 may comprise the example data depicted on the FIG. 1 and the target database 821 may comprise the example target database depicted on the FIG. 2.

Figure 4:
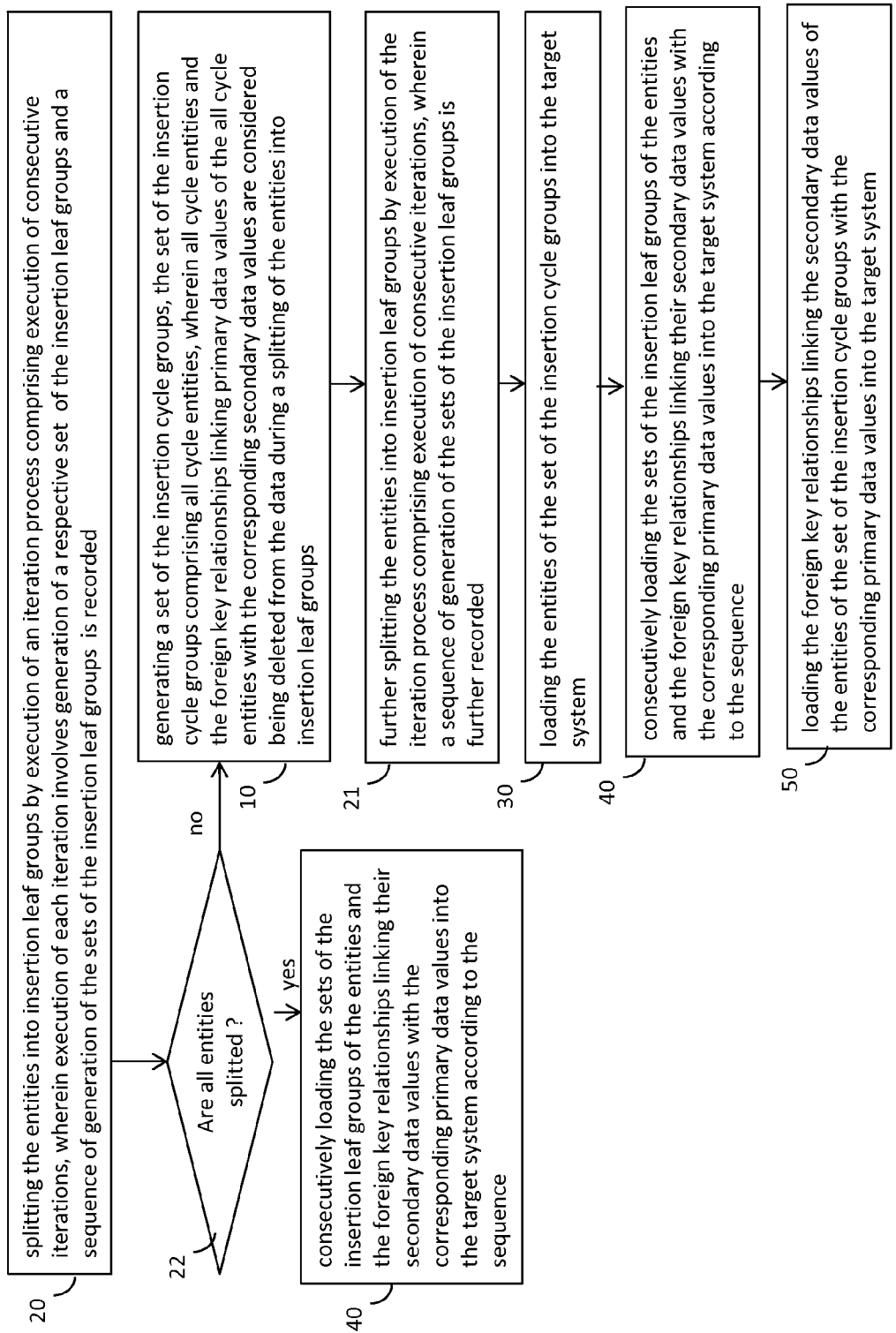
FIG. 4 is a flowchart of process blocks for loading data into a target system.

FIG. 4 illustrates a flowchart of process blocks for loading data into a target system. The data comprises entities. Each entity comprises a corresponding unique primary data value and one or more corresponding secondary data values. At least a portion of the secondary data values has associated foreign key relationships. Each foreign key relationship links the corresponding secondary data value to the corresponding primary data value of another entity. At least a portion of the foreign key relationships are cyclic foreign key relationships. The cyclic foreign key relationships link entities comprising the corresponding primary and secondary data values linked by the cyclic foreign key relationships into one or more loops. The entities linked into the one or more loops comprise one or more cycle entities. When all cycle entities and the foreign key relationships linking the primary data values of all cycle entities with the corresponding secondary data values are considered being deleted from the data, the data comprises no loops of the entities any more.

In the following, a procedure for data loading into a target system will be discussed by using the flowchart diagram of the FIG. 4, the example data depicted on the FIG. 1, the example target database depicted on the FIG. 2, and system depicted on the FIG. 3.

Upon receiving a request for loading of the data in the Tables 100, 101, 102, 103 of the first database 801 to the second database 821, the data migration computer 810 causes the source adapter 811 to download the data from the first database to the data migration computer 810. Afterwards the tuple reordering unit 812 performs process blocks 20, 22, 10, and 21 of the flowchart depicted on the FIG. 4.

In the process block 20 the entities are split into insertion leaf groups by execution of an iteration process comprising execution of consecutive iterations. Execution of each iteration involves generation of a respective set of the insertion leaf groups. The respective set of the leaf groups comprises all entities whose secondary data values have either no foreign key relationships or only one or more foreign key relationship with the primary data values of the entities of the insertion leaf groups generated during execution of any prior iteration. The iteration process is executed until there are no entities left whose secondary data values have either no foreign key relationships or only one or more foreign key relationships with the primary data values of the one or more entities of the insertion leaf groups generated during execution of any previous iteration. A sequence of generation of the sets of the insertion leaf groups is recorded. The numbers of the insertion leaf groups in the sets may be arbitrary, alternatively they may be chosen in accordance with specifications of computers used for performing the procedure for data loading into the target system.

Processing of the example data depicted on the FIG. 1 according to the process block 20 will result in a generation of a first set of the insertion leaf groups. The first set of the insertion leaf groups comprises all entities of the Table 103 because their secondary values do not have any foreign key relationships. Further generation of the sets of the insertion leaf groups is not possible because the entities in the Tables 100-102 are linked by the foreign key relationships in loops.

In a decision process block 22 the number of entities split into the insertion leaf groups is compared against the overall number of entities. In a case when all entities are split into the insertion leaf groups then a process block 40 is performed, otherwise process blocks 10, 21, 30, 40, and 50 are performed.

In a case of processing of the example data depicted on the FIG. 1, it is detected that not all entities are split into the insertion leaf groups in the decision process block 22. Thus further processing of the example data is performed in the process blocks 10, 21, 30, 40, and 50.

In the process block 10 a set of the insertion cycle groups is generated. The set of the insertion cycle groups comprises all cycle entities. The entities, which are not yet split in the one or more insertion leaf groups, may be used for generation of the set of the cycle insertion groups. All cycle entities and the foreign key relationships linking primary data values of all cycle entities with the corresponding secondary data values are considered being deleted from the data during the splitting of the entities into insertion leaf groups. The number of the insertion cycle groups in the set of the insertion cycle groups may be arbitrary, alternatively it may be chosen in accordance with specifications of computers used for performing the procedure for data loading into the target system.

Processing of the example data depicted on the FIG. 1 according to the process block 10 will result in a generation of a Set of insertion cycle groups. This set comprises all entities of the Table 100, because each entity of the Table 100 is in two corresponding loops of entities. For instance, the first loop comprising cycle entity having ID="1" in the Table 100 consists of the entity having ID="1" in the Table 100 and the entity having ID="John" in the Table 102, wherein the entity having ID=1 in the table 100 comprises secondary data value "John" linked by the foreign key relationship with the primary data values of the entity having ID="John" in the Table 102, and the entity having ID="John" in the Table 102 comprises the secondary value "1" linked by the foreign key relationship with the primary data value of the entity having ID="1" in the Table 100. The second loop comprising cycle entity having ID="1" in the table 100 consists of the entity having ID="1" in the table 100, the entity having ID="23" in the Table 101, and the entity having ID="John" in the table 102 linked by the corresponding foreign key relationships, wherein the entity having ID="1" in the table 100 comprises the secondary data value "23" linked by the foreign key relationship with the primary data value of the entity having ID="23" in the table 101, the entity having ID="23" in the table comprises the secondary data value "John" linked by the foreign key relationship with the primary data value of the entity having ID="John" in the table 102, and the entity having ID="John" in the Table 102 comprises the secondary value "1" linked by the foreign key relationship with the primary data value of the entity having ID="1" in the Table 100.

Processing of the example data depicted on the FIG. 1 according to the process block 21 will result in a generation of a second, third, and fourth insertion Set of the insertion leaf groups. Since all entities of the previously generated insertion leaf and cycle groups are excluded from further processing, execution of the process block 21 will result in generation of another three Sets of the insertion leaf groups. Each set of the insertion leaf groups comprises a unique portion of the entities. The second Set comprises all entities of the Table 102. The third set comprises entities of having ID="23" and ID="56" in the Table 101. The fourth set comprises entity having ID="98" in the table 101.

In the process block 30, the entities of the set of the insertion cycle groups are loaded into the target system. The entities of each cycle group may be loaded concurrently with each other. Alternatively, the entities of the set of the insertion cycle groups may be split into several insertion cycle subgroups, and each insertion cycle subgroup may be loaded concurrently with the other ones.

In the process block 40, the Sets of the insertion leaf groups of the entities and the foreign key relationships linking their secondary data values with the corresponding primary data values into the target system are consecutively loaded into the target system according to the sequence. The insertion leaf groups of each set may be loaded concurrently with each other. Alternatively, the entities of each set of the insertion leaf groups and the foreign key relationships linking their secondary data values with the corresponding primary data values may be split into several insertion leaf subgroups, and each insertion leaf subgroup may be loaded concurrently with the other ones.

In the process block 50, the foreign key relationships linking the secondary data values of the entities of the set of the insertion cycle groups with the corresponding primary data values into the target system are loaded. The foreign key relationships linking the secondary data values of the entities of each insertion cycle group may be uploaded concurrently with each other. Alternatively, the foreign key relationships linking the secondary data values of the entities of the set of the insertion cycle groups may be split in foreign key relationship subgroups, and each foreign key relationship subgroup may be uploaded concurrently with the other ones.

Those skilled in the art will clearly understand that the process blocks 21 and 30 may be executed concurrently or in a reversed order with respect to each other.

The process blocks 30, 40, and 50 are performed by the insertion unit 813 of the data migration system 810 depicted on the FIG. 3.

Figure 5:
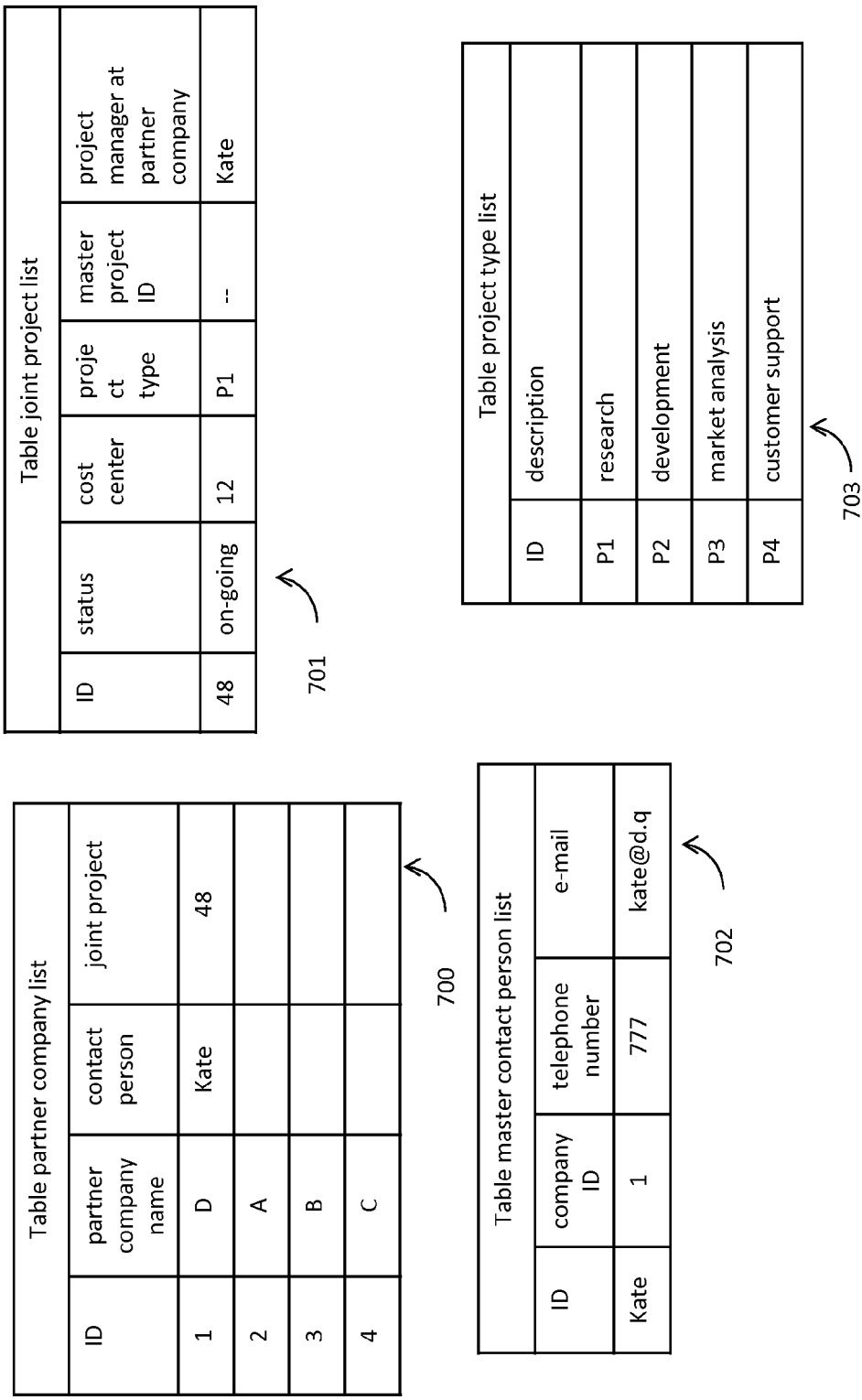
FIG. 5 is the example database after loading of a first insertion group and a cycle group.
Figure 6:
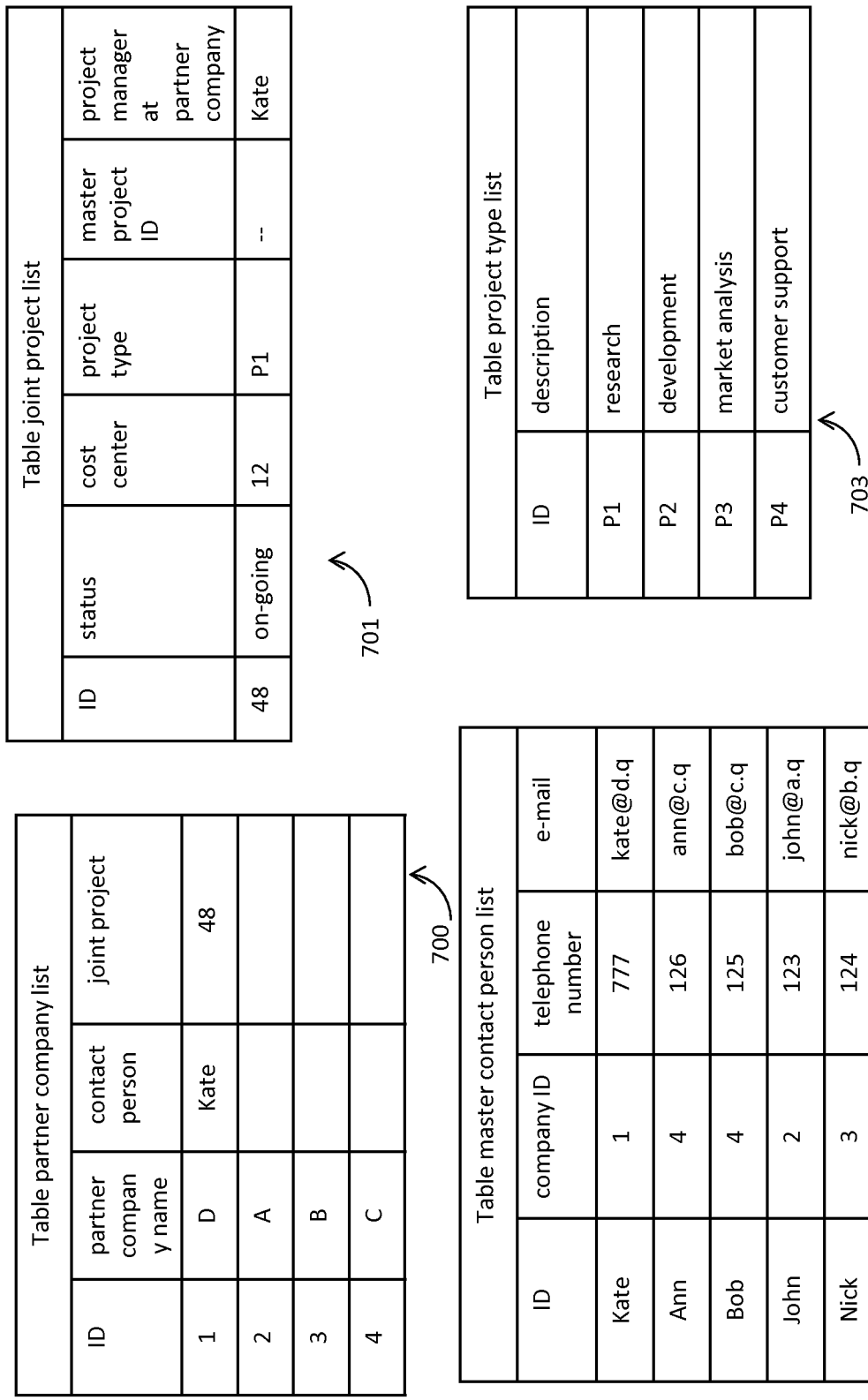
FIG. 6 is the example database after loading of the first insertion group, the cycle group, and a second insertion group.
Figure 7:
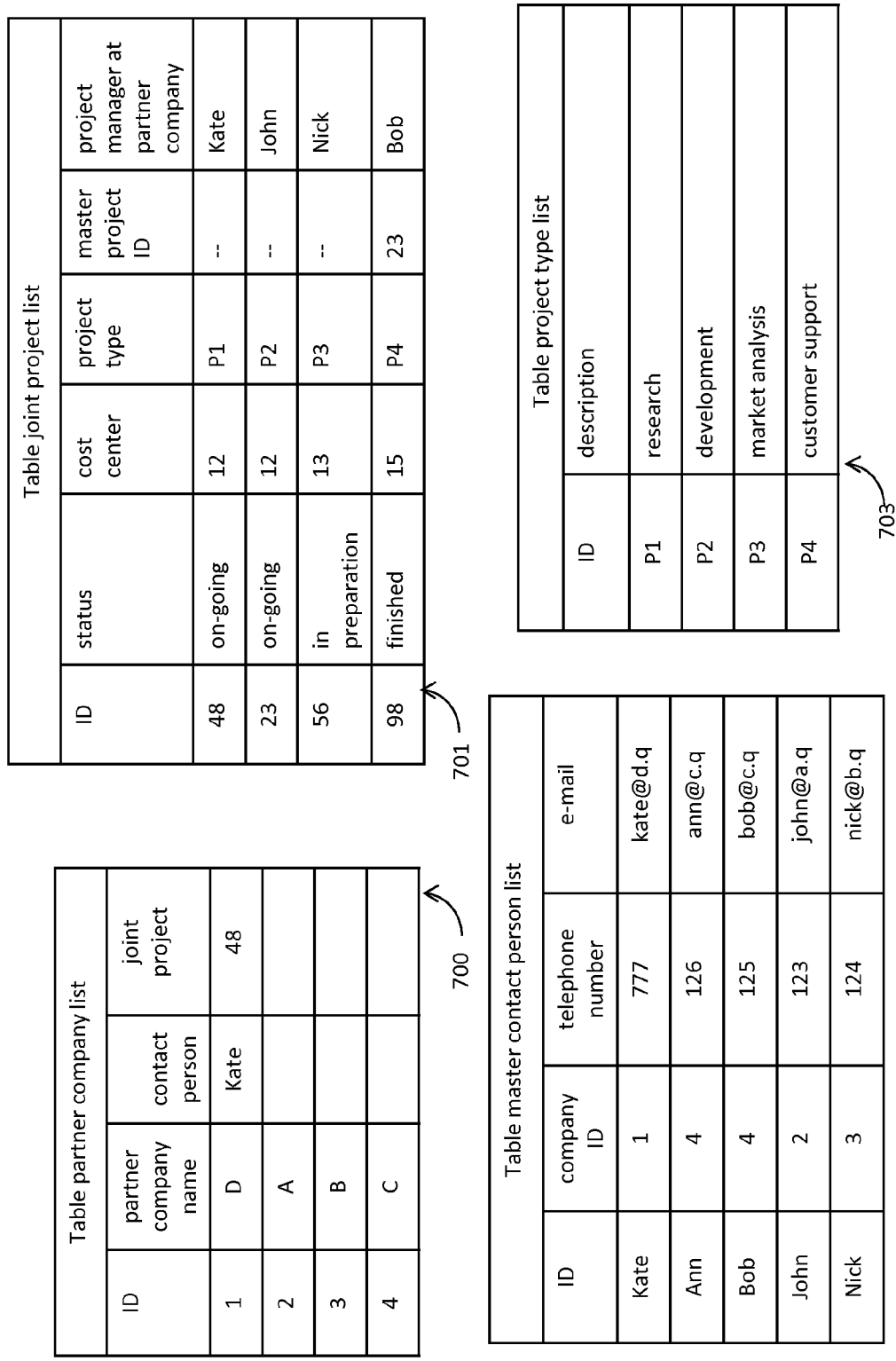
FIG. 7 is the example database after loading of all insertion groups.

FIGS. 5-7 illustrate changes in the example target database during execution of the process blocks 30, 40, and 50 as depicted in the FIG. 4. FIG. 5 illustrates the target database after uploading of the entities of the set of the insertion cycle groups and the first set of insertion leaf groups. Since the identifier "1" is already used in the target database, the identifiers of the entities of the insertion cycle group are renumbered accordingly. In this case the identifiers of the entities of the insertion cycle group are increased by unity. The secondary values of the entities of the cycle insertion group in the columns "contact person" and "joint project" are not uploaded, because they will be uploaded in the process block 50 as foreign key relationships linking their secondary data values with the corresponding primary data values. The identifiers of the entities of the first insertion leaf group are renumbered in a similar way as the identifiers of the entities of the insertion cycle group. FIG. 6 illustrates the target database after uploading of the entities of the set of the insertion cycle groups, the first set of the insertion leaf groups, and the second set of the insertion leaf groups. The table 702 is completely filled, wherein the updated identifiers of the company IDs are used from the table 700. FIG. 7 illustrates the target database after uploading of the entities of the set of the insertion cycle groups, the first set of the insertion leaf groups, the second set of the insertion leaf groups, and the third set of the insertion leaf groups. The table 701 is completely filled.

Figure 8:
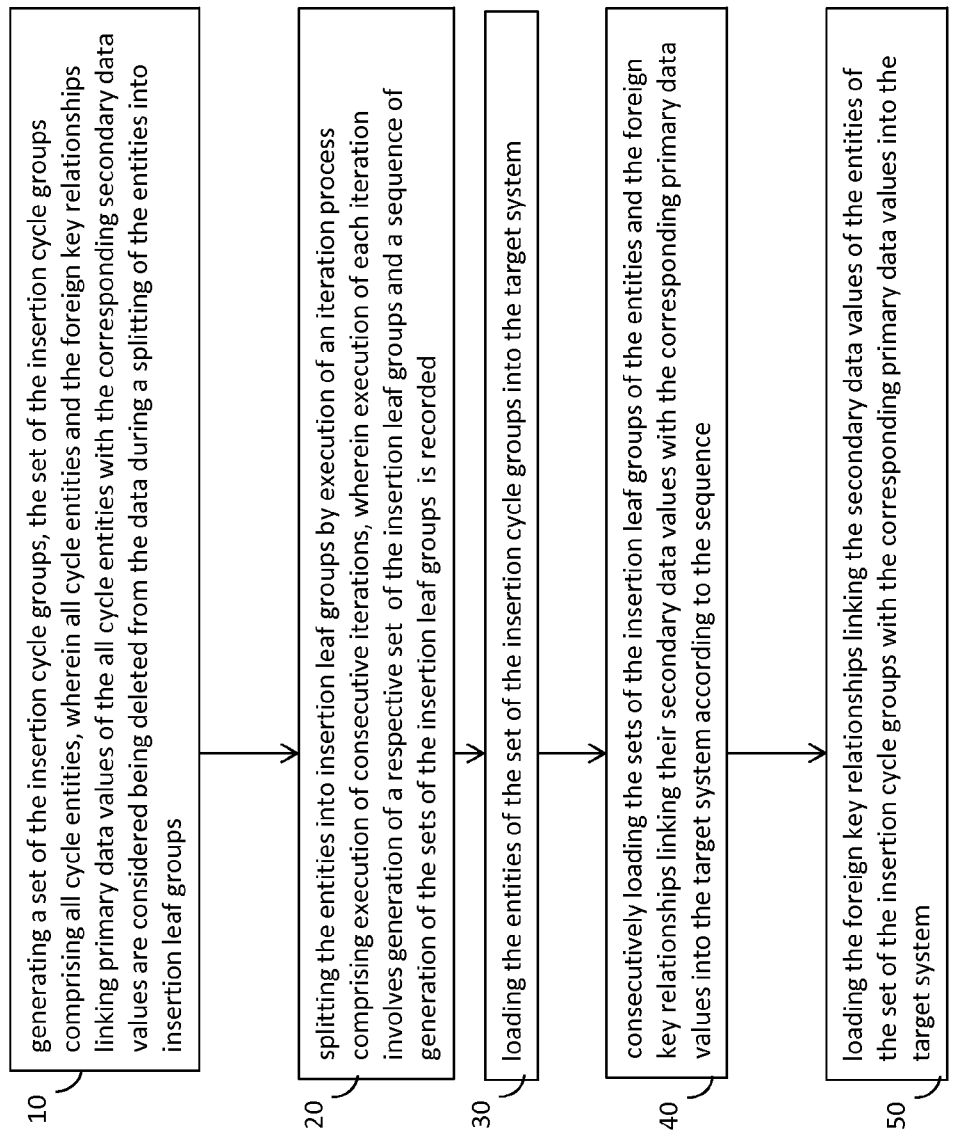
FIG. 8 is another flowchart of process blocks for loading data into a target system.

FIG. 8 illustrates another flowchart of process blocks for loading data into a target system. This flowchart begins with the process block 10. The process block 10 is performed as described above.

Execution of the process block 10 of the flowchart depicted in FIG. 8, using the example data depicted on the FIG. 1, results in a generation of a set of the insertion cycle groups. The set of the insertion cycle groups comprises all entities of the Table 100.

The process block 20 is performed after the process block 10. The process block 20 is performed as described above.

Execution of the process block 20 of the flowchart depicted in FIG. 8, using the example data depicted on the FIG. 1, results in generation of a first, second, and third Set of the insertion leaf groups. The first Set of the insertion leaf group comprises all entities of the tables 103 and 102. The second Set of the insertion leaf groups comprises entities of having ID="23" and ID="56" in the table 101. The third Set of the insertion leaf groups comprises entity having ID="98" in the table 101. Thus execution of the flowchart of the process blocks depicted on the FIG. 8 results in generation of fewer amount of the Sets of the insertion leaf groups in comparison with the flowchart of the process blocks depicted on the FIG. 4

Process blocks 30, 40, and 50 depicted on the FIG. 8 are performed in the same way as process blocks 30, 40, and 50 depicted on the FIG. 4.

Those skilled in the art will clearly understand that the process blocks 20 and 30 may be executed concurrently or in a reversed order with respect to each other.

In a case when the entities are not linked in one or more loops the data can be loaded into the target system by performing only process blocks 20 and 40.

Figure 9:
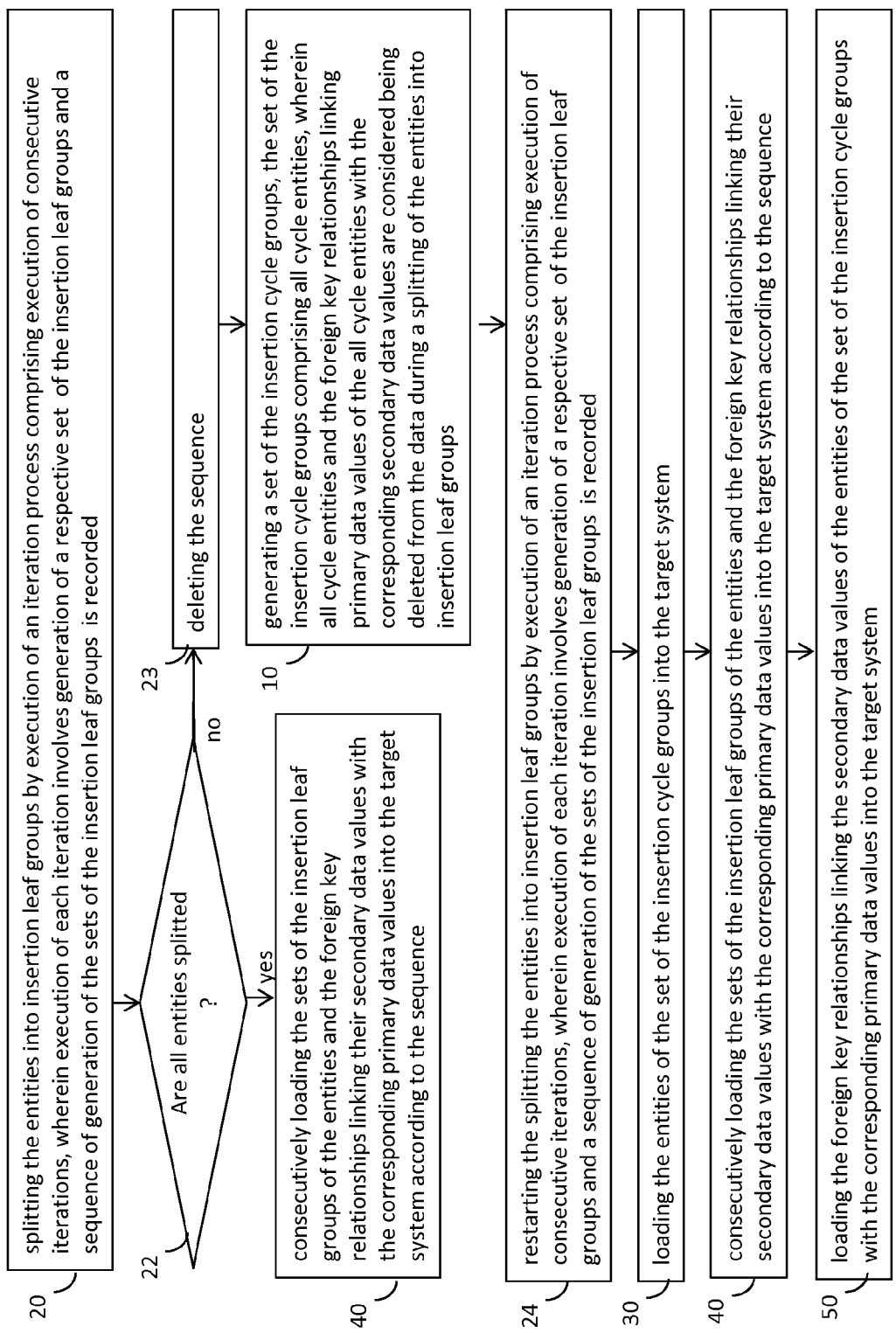
FIG. 9 is yet another flowchart of process blocks for loading data into a target system.

FIG. 9 illustrates another flowchart of process blocks for loading data into the target system. The flowchart begins with performing process block 20 in a same way as it was described above. In a decision process block 22, the number of entities split into the leaf groups is compared against the overall number of entities. In case when all entities are split in the insertion leaf groups (i.e. the data comprises no entities linked in one or more loops) the process block 40 is performed as described above. Alternatively, if not all entities are split into the insertion leaf groups, the sequence is deleted in process block 23. Further the process block 10 is performed as described above. The entities, which were not split into the one or more insertion groups in the previously executed process block 20, may be used for generating the set of the insertion cycle groups in the process block 10. In a process block 24 the splitting of the entities into the insertion leaf groups is restarted and performed in the same way as in the description of the process block 20. Further the process blocks 30, 40, and 50 are executed in the same way as described above. Those skilled in the art will clearly understand that the process blocks 24 and 30 may be executed concurrently or in a reversed order with respect to each other.

Each flowchart depicted on the FIGS. 4, 8, and 9 has its own advantages. The choice of each flowchart may be determined by a structure of the data to be loaded into the target system. For instance, if it is known upfront that the data comprises cycle entities, then utilization of the flowchart depicted on the FIG. 8 may be an optimum choice, since the flowchart depicted on the FIG. 8 begins with generation of the insertion cycle group. Moreover, generation of the insertion cycle group before the splitting of the entities into the insertion leaf groups may result in a fewer amount of the generated insertion leaf groups in comparison to the flowchart of the FIG. 4.

If the prior knowledge regarding the structure of the data is absent, then utilization of the flowchart depicted on the FIG. 4 may be an optimum choice. In a case when the data do not comprise any cycle entities, no computation time and/or computer resources will be wasted for searching cycle entities in the database, and the processing algorithm is reduced to an execution of the process blocks 20 and 40.

Since identification of the Set of the insertion cycle groups may require much more computing time and/or computer resources than splitting of the entities in the insertion leaf groups, it may be beneficial to reduce a volume of data, wherein the cycle group is identified. This concept lies behind the flowchart of the FIG. 9. First, in the process block 20 all possible insertion leaf groups are generated. Afterwards the insertion cycle group is generated using the entities not yet split into the insertion leaf groups.

Figure 10:
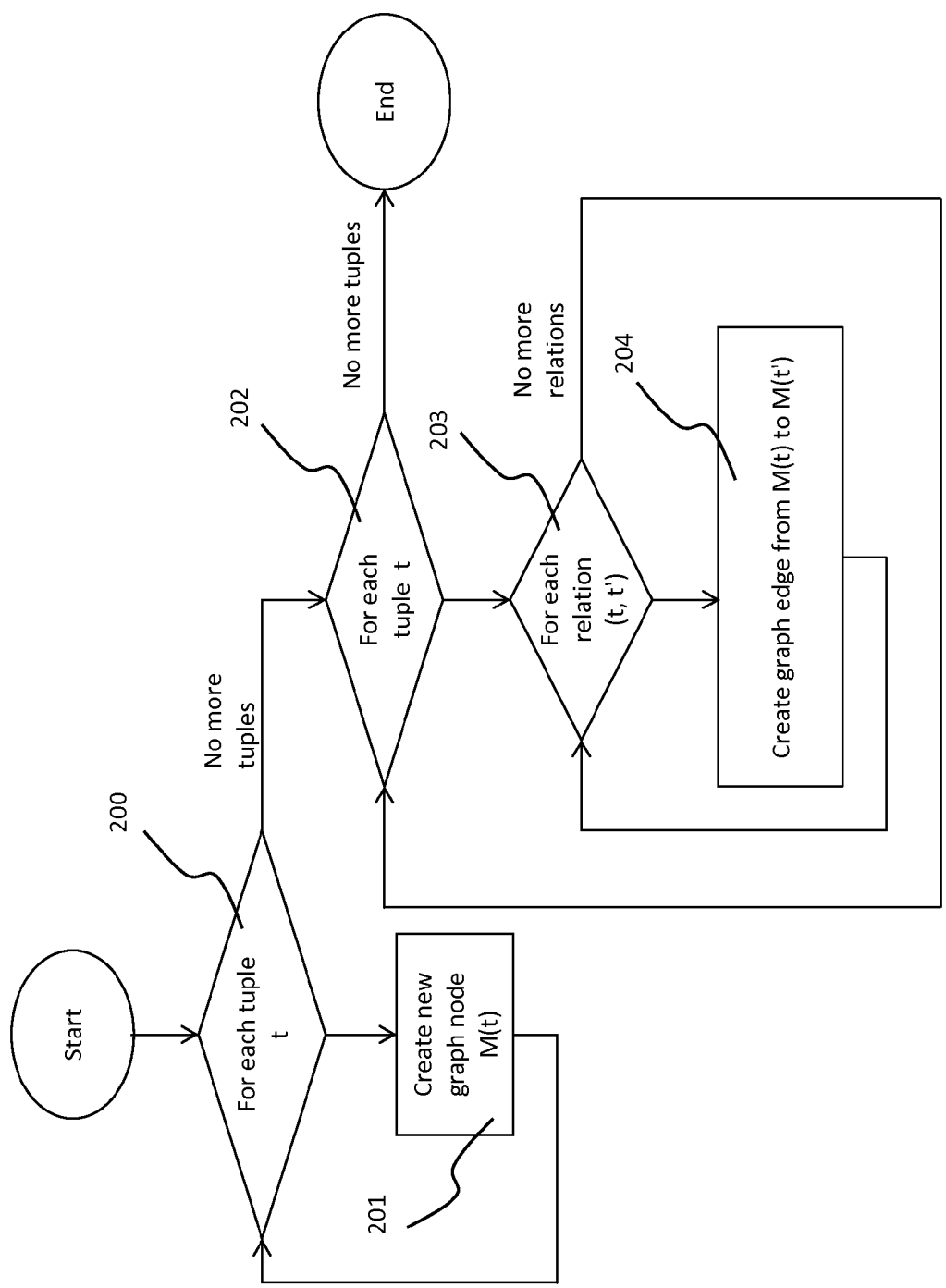
FIG. 10 is a flowchart of process blocks for generating of the directional graph using the data to be loaded into a target system.

FIG. 10 is illustrates a flowchart of the process blocks for generating of the directional graph using data to be loaded into a target system. In a process block 200, a loop comprising process block 201 is executed until all data entities are processed. All entities are processed one by one during iterations of the process block 200. In the process block 201, a graph node corresponding to a current entity is generated. When the process blocks 200 and 201 are completely executed, a complete set of graph nodes is generated, wherein each entity has a unique graph node. Afterwards another two loops controlled by process blocks 202 and 203 are executed. The loop controlled by the decision process block 203 is embedded into the loop controlled by the decision process block 202. In the loop controlled by the process block 202, the entities are processed one by one, and in the embedded loop controlled by the process block 203, a process block 204 is executed. In the process blocks 203 and 204, all foreign key relationships of the current entity selected in the decision process block 202 are processed one by one. In the process block 204, all foreign key relationships of the secondary data values of the current entity are translated into edges of the directional graph linking the node of the current entity with other nodes of other entities. When the process blocks 202, 203, and 204 are completely executed, generation of the directional graph is completed, wherein for a given foreign key relationship linking the respective secondary data value with the respective primary data value the graph edge begins at the node corresponding to the entity comprising the respective secondary data value, and ends at the node corresponding to the entity comprising the respective primary data value.

Figure 11:
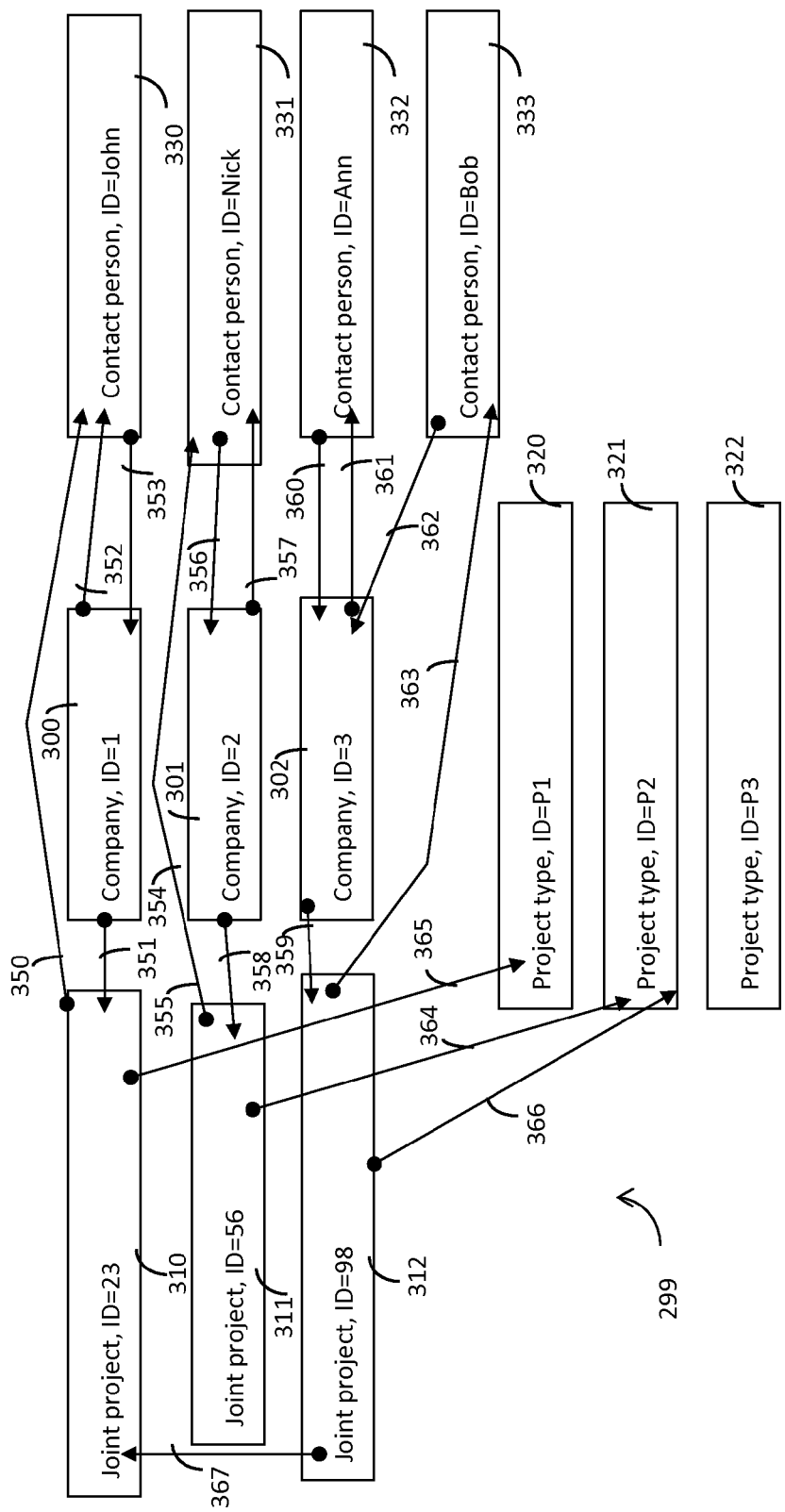
FIG. 11 is a directional graph generated using the data to be loaded into a target system.

FIG. 11 illustrates a directional graph 299 generated using algorithm presented on the FIG. 10 and input data 100, 101, 102, 103 presented in the FIG. 1. Every record in the tables 100, 101, 102, 103 is represented by a unique node 300, 301, 302, 330, 331, 332, 333, 310, 311, 312, 320, 321, and 322 in the directional graph 299. For instance the records "1", "2", and "3" in the table partner company list 100 are represented by the nodes 300, 301, and 302 correspondingly.

The foreign key relationships 110, 111, 112, 113, 114, 115, 116, and 117 are represented by graph edges 350-367. The nodes 300, 301, and 302 belong to a feedback node set. The feedback set of nodes can be defined as follows: the feedback node set is a portion of nodes linked by graph edges in loops, wherein when said feedback nodes are removed from the directional graph, the directional graph comprises no nodes connected by graph edges in loops. For instance, the node 300 is a part of two loops of the nodes. The first loop comprises the nodes 300, 330, and 310 linked by the graph edges 353, 351, and 350. The second loop comprises the nodes 300 and 330 linked by the graph edges 352 and 353. If the node 300 and graph edges 352, 353, and 351 linking this node with other nodes are removed, the two aforementioned loops are removed from the graph as well.

Figure 12:
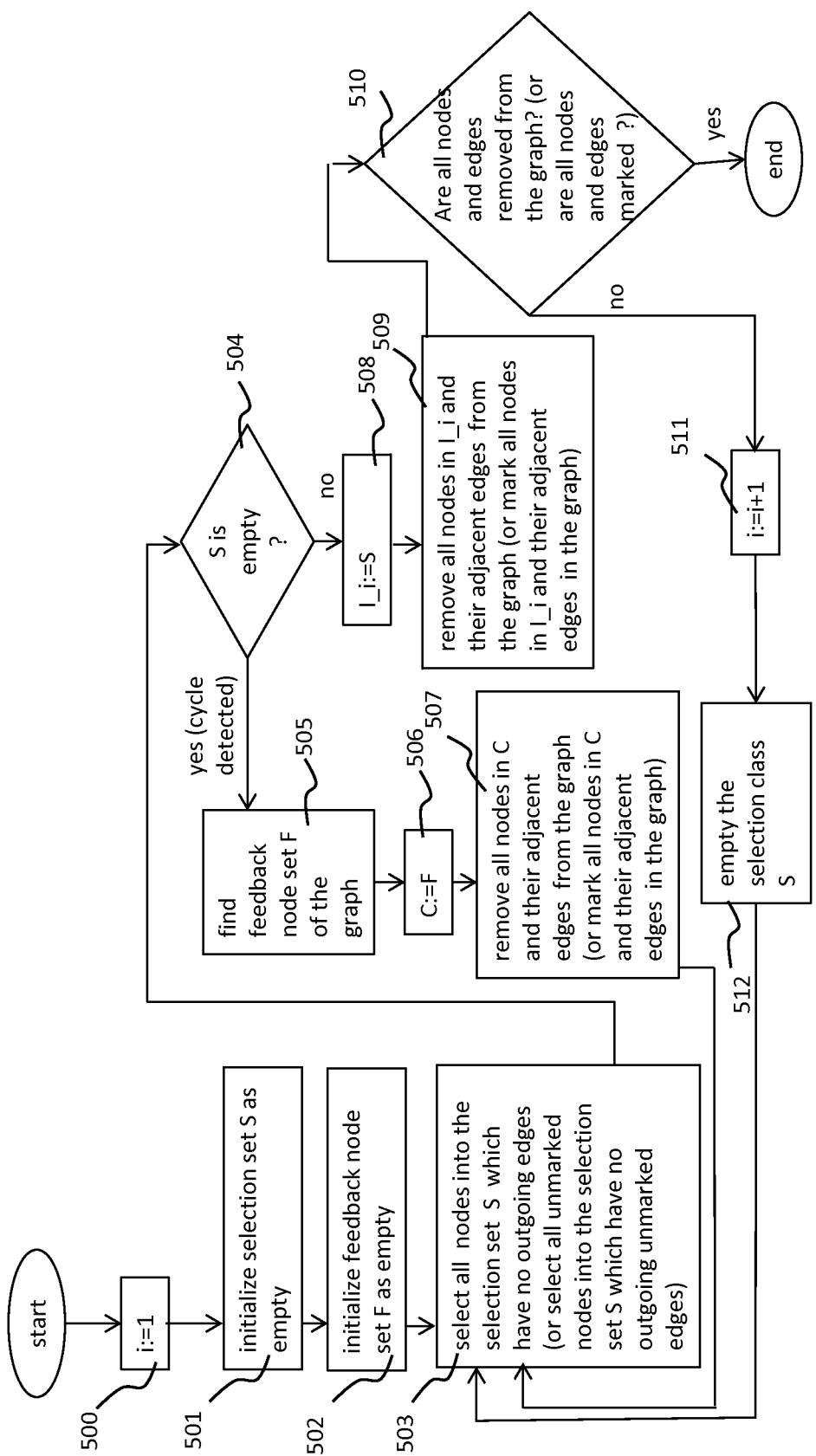
FIG. 12 is a flowchart of process blocks for generating of insertion groups using a directional graph.

FIG. 12 illustrates a flowchart of process blocks for generating of insertion groups using a directional graph. In a process block 500, an iteration counter i is set to unity. In a process block 501, a selection set S is initialized as empty. In a process block 502, a feedback node set F is initialized as empty. In a process block 503, all leaf nodes of the graph (nodes having no outgoing edges) are selected into the selection set S. In a decision process, block 504 is controlled whether the selection set S is empty. In a case when the selection set S is empty, process blocks 505, 506, and 507 are performed and the algorithm is further continued with the process block 503. In the process block 505, a feedback node set F is identified. In the process block 506, the feedback node set F is selected into a cycle insertion group C. In the process block 507, all nodes of the insertion group C and their adjacent edges are removed from the graph. In a case when in the decision process block 504, it is determined that the selection set S is not empty, the loop comprising process blocks 508, 509, 510, 511, and 512 is executed, and the process is further continued with the process block 503. In the process block 508, the nodes of the selection set S are selected into a current insertion group I_i of a current iteration. In the process block 509, the nodes of the current insertion group I_i and their adjacent edges are removed from the graph. In the decision process, block 510 is checked whether all nodes are removed from the graph. In a case when all nodes are removed from the graph, execution of algorithm is stopped. Otherwise the process block 511 is executed. The iteration counter i is incremented by unity in the process block 511. The selection set S is emptied in the process block 512.

Alternatively the nodes and their adjacent edges selected into the insertion groups are marked instead of being deleted. The marking is performed in the process blocks 509 and 507. In the decision process block 510, execution of the algorithm is stopped when all nodes are marked. In the process block 503, the unmarked nodes having no outgoing unmarked edges are selected into the selection set S.

FIG. 13 represents a table illustrating selection of the nodes of the directional graph illustrated on the FIG. 11 into insertion groups and a corresponding sequence of execution of the process blocks of the flowchart for the generating of the insertion groups illustrated on the FIG. 12. In a first iteration, the process blocks 500, 501, 502, 503, 504, 508, 509, 510, 511, and 512 are executed, and the nodes 320, 321, and 322 are selected into the first selection group. In a second iteration, both loops of the decision process block 504 are executed. First the process blocks 503, 504, 505, 506, and 507 are executed, and the nodes 300, 301, and 302 are selected into the cycle insertion group. Afterwards the process blocks 503, 504, 508, 509, 510, 511, and 512 are executed, and the nodes 330, 331, 332, and 333 are selected into the second insertion group. In a third iteration, the process blocks 503, 504, 508, 509, 510, 511, and 512 are executed, and the nodes 310 and 311 are selected into the third insertion group. In a fourth iteration, the process blocks 503, 504, 508, 509, and 510 are executed, and the node 312 is selected into the fourth insertion group.

Figure 14:
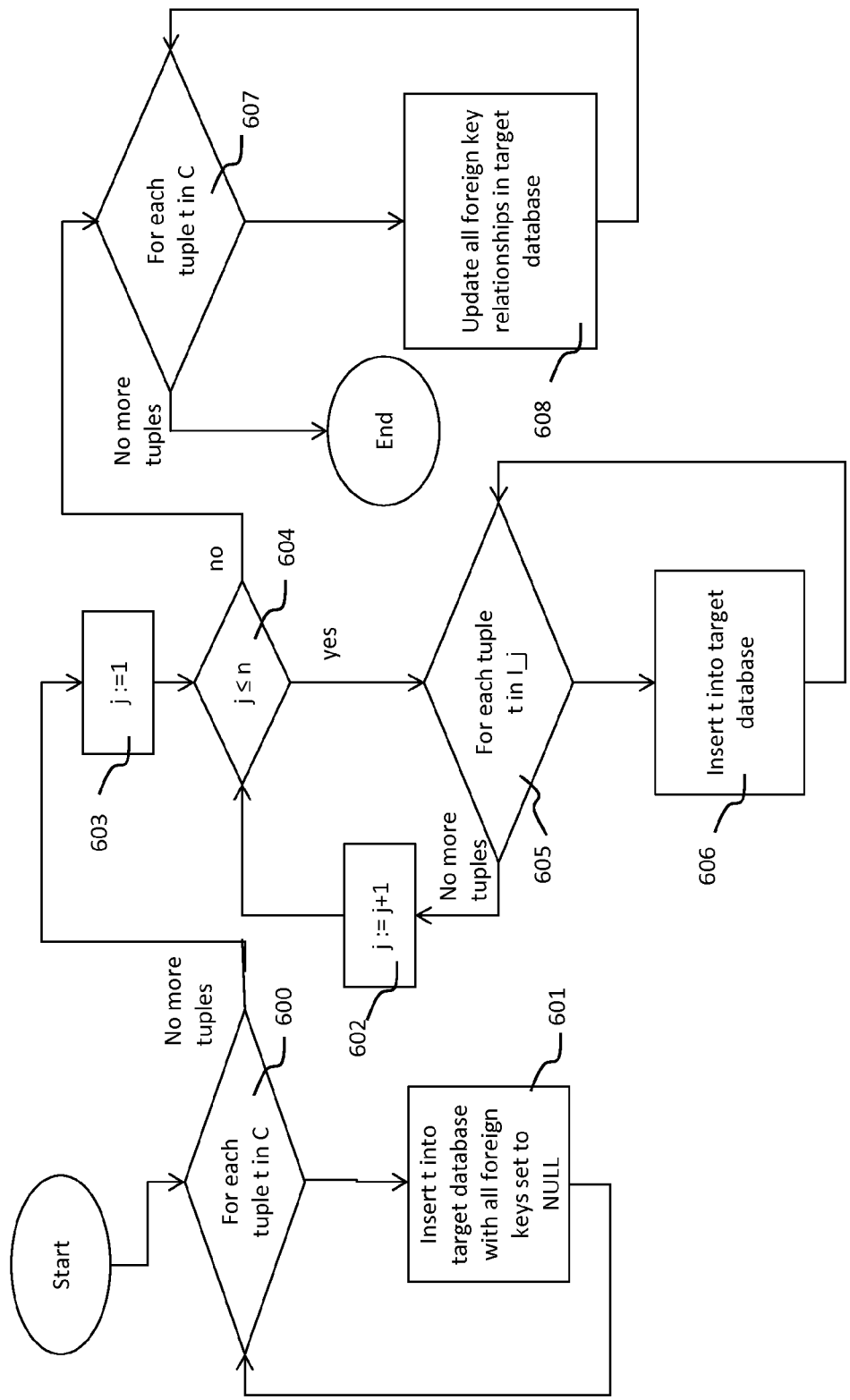
FIG. 14 is a flowchart of process blocks for loading of the entities corresponding to the nodes of the insertion groups into a target system.

FIG. 14 illustrates a flowchart of process blocks for loading of the entities corresponding to the nodes of the insertion groups into a target system. In a process block 600, a loop is executed until all data entities corresponding to the nodes of the cycle insertion group are inserted into the target system. In a process block 601, the data entities corresponding to the nodes of the cycle insertion group are loaded into the target system one by one without their foreign key relationships. When the process blocks 600 and 601 are completely executed, all entities corresponding to the nodes of the insertion cycle group are loaded into the target system. In a process block 603, a value of an iteration counter j is set to unity. Afterwards another two loops controlled by process blocks 604 and 605 are executed. The loop controlled by the decision process block 605 in embedded into the loop controlled by the process block 604. In the loop controlled by the process block 604, the loop is executed until the iteration counter exceeds the number of the insertion leaf groups. In the loop controlled by the process block 604, all insertion leaf groups are processed according to their numeration. In each iteration of the loop controlled by the process block 604, the embedded loop controlled by the process block 605 is executed once, and the iteration counter is incremented by unity in a process block 602. The loop controlled by the decision process block 605 is executed until all nodes of the current insertion leaf group determined by the value of the iteration counter are processed. A process block 606 is executed once in each iteration of the loop controlled by the process block 605. The entities corresponding to the nodes of the current insertion leaf group are processed one by one in the loop controlled by the process block 605. In the process block 606, the entity corresponding to the current node of the current insertion leaf group and the foreign key relationships linking its secondary data values with the corresponding primary data values is loaded into the target system. After complete execution of the process, blocks 604, 602, 605, and 606 all entities and the foreign key relationships linking their secondary data values with the corresponding primary data values are loaded into the target system. Afterwards another loop controlled by a process block 607 is executed until all entities corresponding to the nodes of the insertion cycle group are processed. A process block 608 is executed in each iteration of the loop controlled by the decision process block 607. In the process block 608, the foreign key relationships linking the secondary data values of the current entity with the corresponding primary data values are loaded into the target system, wherein the current entity is determined by the process block 607. When the process blocks 607 and 608 are completely executed, all foreign key relationships linking the secondary data values of said entities with the corresponding primary data values are loaded into the target system.

FIG. 15 illustrates a pseudo code implementation of the flowchart represented on the FIG. 10. A set of tuples T for a given table schema S is used as input (line 1) and a directed graph G=(N,E) is produced (lines 3 and 22) after execution of the algorithm. A process of creation of the nodes of the directed graph is formulated in lines 9-13 of the pseudo code. This part of the pseudo code corresponds to the process blocks 200 and 201 on the FIG. 5. A process of creation of the edges of the directed graph is formulated in lines 15-20 of the pseudo code. This part of the pseudo code corresponds to the process blocks 202, 203, and 204 on the FIG. 5. Those skilled in the art will understand the pseudo code in every detail.

FIG. 16 illustrates a pseudo code implementation of an algorithm for generation of the insertion groups. This algorithm is a detailed implementation of a portion of the flowchart presented on the FIG. 12. A directed graph G=(N, E) is used as input and insertion groups are generated as a result of execution of the algorithm. C is a cycle insertion set initialized as empty (line 6), Q is a first-in-first-out buffer (FIFO) (line 9), V[n] is a linear array, wherein each element of the linear array corresponds to the unique node and is equal to the number of outgoing edges of the corresponding node (lines 10 and 17), variable m is equal to the number of nodes in the graph (line 11). The nodes having no outgoing edges are pushed into FIFO buffer Q (line 20). All edges c[e] are colored black (lines 24-26). The nodes are selected into the insertion groups (lines 29-57). In a case when not all nodes are selected into the insertion groups the cycle nodes are selected into the insertion cycle group and removed from the graph together with their adjacent edges (lines 59-64), and afterwards the process of the selecting of the nodes into the insertion groups is repeated. Those skilled in the art will understand the pseudo code in every detail.

FIG. 17 represents a pseudo code implementation of the flowchart illustrated in FIG. 14. A part of the pseudo code (lines 3-6) corresponds to the process blocks 600 and 601. Another part of the pseudo code (lines 9-14) corresponds to the process blocks 603, 604, 602, 605, and 606. Yet another part of the pseudo code (lines 17-20) corresponds to the process blocks 607 and 608. Those skilled in the art will understand the pseudo code in every detail.

What is claimed is:

1. A computer implemented method for loading data into a target system having a processor, wherein the data comprises entities, each of the entities having a corresponding unique primary data value and one or more corresponding secondary data values, at least a portion of the secondary data values having associated foreign key relationships, each foreign key relationship linking the corresponding secondary data value to the corresponding primary data value of another entity, the method comprising:
   splitting the entities into insertion leaf groups by execution of an iteration process by the processor, comprising execution of consecutive iterations, wherein execution of each iteration involves generation of a respective set of the insertion leaf groups, the respective set of the insertion leaf groups containing entities whose secondary data values have either no foreign key relationships or only one or more foreign key relationships with the primary data values of the entities of the insertion leaf groups generated during execution of any prior iteration, wherein the iteration process is executed until there are no entities left whose secondary data values have either no foreign key relationships or only one or more foreign key relationships with the primary data values of the one or more entities of the insertion leaf groups generated during execution of any previous iteration, wherein a sequence of generation of the sets of the insertion leaf groups is recorded; and
   consecutively loading the sets of the insertion leaf groups of the entities and the foreign key relationships linking their secondary data values with the corresponding primary data values into the target system according to the sequence.

2. The method of claim 1, wherein at least a portion of the foreign key relationships are cyclic foreign key relationships, wherein the cyclic foreign key relationships link entities comprising the corresponding primary and secondary data values linked by the cyclic foreign key relationships into one or more loops,
   wherein the entities linked into the one or more loops comprise one or more cycle entities, wherein when all cycle entities and the foreign key relationships linking the primary data values of all cycle entities with the corresponding secondary data values are considered being deleted from the data, the data comprises no loops of the entities any more,
   wherein the method further comprises:
      generating a set of the insertion cycle groups, the set of the insertion cycle groups comprising all cycle entities, wherein all cycle entities and the foreign key relationships linking primary data values of the all cycle entities with the corresponding secondary data values are considered being deleted from the data during a splitting of the entities into insertion leaf groups;
      before the consecutively loading of the sets of the insertion leaf groups of the entities and the foreign key relationships linking their secondary data values with the corresponding primary data values into the target system loading the entities of the set of the insertion cycle groups into the target system; and
      after the consecutively loading of the sets of the insertion leaf groups of the entities and the foreign key relationships linking their secondary data values with the corresponding primary data values into the target system, loading the foreign key relationships linking the secondary data values of the entities of the set of the insertion cycle groups with the corresponding primary data values into the target system.

3. The method of claim 2, wherein the generating of the set of insertion cycle groups comprising all cycle entities is performed before the splitting of the entities into the insertion leaf groups.

4. The method of claim 2, wherein after the splitting of the entities into the insertion leaf groups and before the loading of the entities of the set of the insertion cycle groups into the target system the generating of the set of the insertion cycle groups using the entities not yet split into the insertion leaf groups is performed,
   wherein after the generating of the set of the insertion cycle groups and before the consecutively loading of the sets of the insertion leaf groups of the entities and the foreign key relationships linking their secondary data values with the corresponding primary data values into the target system, the splitting of the entities into the insertion leaf groups and the recoding of the sequence of generation of the sets of the insertion leaf groups are further performed.

5. The method of claim 2, wherein after the splitting of the entities into the insertion leaf groups and before the loading of the entities of the set of the insertion cycle groups into the target system the generating of the set of the insertion cycle groups using the entities not yet split into the insertion leaf groups is performed,
   wherein after the generating of the set of the insertion cycle groups and before the consecutively loading of the sets of the insertion leaf groups of the entities and the foreign key relationships linking their secondary data values with the corresponding primary data values into the target system, the following is performed:

deleting the sequence;
after the deleting of the sequence restarting of the splitting of the entities into the insertion leaf groups by execution of the iteration process comprising execution of the consecutive iterations.

6. The method of claim 1, wherein the consecutively loading of the sets of the insertion leaf groups of the entities and the foreign key relationships linking their secondary data values with the corresponding primary data values into the target system according to the sequence comprises:
splitting the entities of one of the sets of the insertion leaf groups in at least two leaf group portions; and
loading each of the at least two leaf group portions into the target system by concurrent execution of insertion of entities of the each of the at least two leaf group portions and the foreign key relationships linking their secondary data values with the corresponding primary data values into the target system.

7. The method claim 2, wherein the loading of the entities of the set of the insertion cycle group into the target system comprises:
splitting the entities of the set of the insertion cycle groups in at least two cycle group portions; and
loading each of the at least two cycle group portions into the target database by concurrent execution of insertion of entities of the each of the at least two cycle group portions into the target system.

8. The method claim 2, wherein the loading of the foreign key relationships linking the secondary data values of the entities of the set of the insertion cycle groups with the corresponding primary data values into the target system comprises:
splitting the foreign key relationships linking the secondary data values of the entities of the set of the insertion cycle groups with the corresponding primary data values in at least two relationship group portions; and
loading each of the at least two relationship group portions into the target system by concurrent execution of insertion of the foreign key relationships of the each of the at least two relationship group portions into the target system.

9. The method claim 1 further comprising:
generating a directional graph, wherein each entity corresponds to a unique node of the graph, each foreign key relationship corresponding to a unique edge of the graph, wherein for a given foreign key relationship linking the respective secondary data value with the respective primary data value the graph edge begins at the node corresponding to the entity comprising the respective secondary data value, and ends at the node corresponding to the entity comprising the respective primary data value.

10. A system for loading data into a target system, wherein the data comprises entities, each of the entities having a corresponding unique primary data value and one or more corresponding secondary data values, at least a portion of the secondary data values having associated foreign key relationships, each foreign key relationship linking the corresponding secondary data value to the corresponding primary data value of another entity, the system comprising:
a processor; and
a non-transitory computer readable storage medium having program instructions embodied therewith, the program instructions executable by a processor to cause the processor to perform:
splitting the entities into insertion leaf groups by execution of an iteration process comprising execution of consecutive iterations,
wherein execution of each iteration involves generation of a respective set of the insertion leaf groups is, the respective set of the insertion leaf groups containing entities whose secondary data values have either no foreign key relationships or only foreign key relationship(s) with the primary data values of the entities of the insertion leaf groups generated during execution of any prior iteration,
wherein the iteration process is executed until there are no entities left which secondary data values have either no foreign key relationships or only one or more foreign key relationships with the primary data values of the one or more entities of the insertion leaf groups generated during execution of any previous iteration, wherein a sequence of generation of the sets of the insertion leaf groups is recorded; and
consecutively loading the sets of the insertion leaf groups of the entities and the foreign key relationships linking their secondary data values with the corresponding primary data values into the target system according to the sequence.

11. The system of claim 10, wherein at least a portion of the foreign key relationships are cyclic foreign key relationships, wherein the cyclic foreign key relationships link entities comprising the corresponding primary and secondary data values linked by the cyclic foreign key relationships into one or more loops,
wherein the entities linked into the one or more loops comprise one or more cycle entities, wherein when all cycle entities and the foreign key relationships linking the primary data values of all cycle entities with the corresponding secondary data values are considered being deleted from the data, the data comprises no loops of the entities any more, the method further comprising:
generating a set of insertion cycle groups, the set of the insertion cycle groups comprising all cycle entities, wherein all cycle entities and the foreign key relationships linking primary data values of the all cycle entities with the corresponding secondary data values are considered being deleted from the data during a splitting of the entities into insertion leaf groups;
before the consecutively loading of the sets of the insertion leaf groups of the entities and the foreign key relationships linking their secondary data values with the corresponding primary data values into the target system, loading the entities of the set of the insertion cycle groups into the target system; and
after the consecutively loading of the sets of the insertion leaf groups of the entities and the foreign key relationships linking their secondary data values with the corresponding primary data values into the target system, loading the foreign key relationships linking the secondary data values of the entities of the set of the insertion cycle groups with the corresponding primary data values into the target system.

12. The system of claim 11, wherein the method further comprises performing of the generating of the set of the insertion cycle groups comprising all cycle entities before the splitting of the entities into the insertion leaf groups.

13. The system of claim 11, wherein the method further comprises:

after the splitting of the entities into the insertion leaf groups and before the loading of the entities of the set of the insertion cycle groups into the target system, performing of the generating of the set of the insertion cycle groups using the entities not yet split into the insertion leaf groups; and after the generating of the set of the insertion cycle groups and before the consecutively loading of the sets of the insertion leaf groups of the entities and the foreign key relationships linking their secondary data values with the corresponding primary data values into the target system, further performing the splitting of the entities into the sets of the insertion leaf groups and the recoding of the sequence of generation of the sets of the insertion leaf groups.

14. The system claim 10, wherein the method further comprises:

generating a directional graph, wherein each entity corresponds to a unique node of the graph, each foreign key relationship corresponding to a unique edge of the graph, wherein for a given foreign key relationship linking the respective secondary data value with the respective primary data value, the graph edge begins at the node corresponding to the entity comprising the respective secondary data value, and ends at the node corresponding to the entity comprising the respective primary data value.

15. A computer program product for loading data into a target system, wherein the data comprises entities, each of the entities having a corresponding unique primary data value and one or more corresponding secondary data values, at least a portion of the secondary data values having associated foreign key relationships, each foreign key relationship linking the corresponding secondary data value to the corresponding primary data value of another entity, the computer program product comprising a non-transitory computer readable storage medium having program instructions embodied therewith, the program instructions executable by a processor to cause the processor to perform:

splitting the entities into insertion leaf groups by execution of an iteration process comprising execution of consecutive iterations, wherein execution of each iteration involves generation of a respective set of the insertion leaf groups, the respective set of the insertion leaf groups containing entities whose secondary data values have either no foreign key relationships or only one or more foreign key relationships with the primary data values of the entities of the insertion leaf groups generated during execution of any prior iteration, wherein the iteration process is executed until there are no entities left whose secondary data values have either no foreign key relationships or only one or more foreign key relationships with the primary data values of the one or more entities of the insertion leaf groups generated during execution of any previous iteration, wherein a sequence of generation of the sets of the insertion leaf groups is recorded; and consecutively loading the sets of the insertion leaf groups of the entities and the foreign key relationships linking their secondary data values with the corresponding primary data values into the target system according to the sequence.

* * * * *